| United States Patent [19] | [11] Patent Number: 4,963,372 |
| Zumbé | [45] Date of Patent: Oct. 16, 1990 |

[54] CONSUMER FRIENDLY CHOCOLATE

[75] Inventor: Albert Zumbé, Neuchatol, Switzerland

[73] Assignee: Jacobs Suchard AG, Zurich, Switzerland

[21] Appl. No.: 298,997

[22] Filed: Jan. 19, 1989

[30] Foreign Application Priority Data

Jan. 8, 1988 [DE] Fed. Rep. of Germany ....... 3800323

[51] Int. Cl.$^5$ ...................... A23G 3/00; A23L 1/302; A23L 1/304; A23L 1/305
[52] U.S. Cl. ........................................ 426/72; 426/73; 426/74; 426/660; 426/804
[58] Field of Search ............... 426/660, 804, 613, 631, 426/658, 72, 73, 74

[56] References Cited

U.S. PATENT DOCUMENTS

| 2,487,931 | 11/1949 | Lataner | 426/660 |
| 2,760,867 | 8/1956 | Kempf et al. | 426/660 |
| 2,904,438 | 9/1959 | O'Rourke | 426/660 |
| 3,769,030 | 10/1973 | Kleinert | 426/660 |
| 4,078,093 | 3/1978 | Girsh | 426/660 |
| 4,107,347 | 8/1978 | Burley | 426/660 |
| 4,670,268 | 6/1987 | Mahmoud | 426/72 |

FOREIGN PATENT DOCUMENTS

| 0189161 | 7/1986 | European Pat. Off. . |
| 0126666 | 9/1987 | European Pat. Off. . |
| 3434283 | 3/1986 | Fed. Rep. of Germany . |
| 3440732 | 5/1986 | Fed. Rep. of Germany . |
| 3008900 | 8/1987 | Fed. Rep. of Germany . |
| 80/02636 | 12/1980 | PCT Int'l Appl. . |
| WO82/01132 | 4/1982 | PCT Int'l Appl. . |
| 506954 | 6/1971 | Switzerland . |

OTHER PUBLICATIONS

Minifie et al., Chocolate, Cocoa & Confectionary 2nd ed. Air Pub. Co. Westport Conn., 1980, p. 131.

*Primary Examiner*—Jeanette Hunter
*Attorney, Agent, or Firm*—Burns, Doane, Swecker & Mathis

[57] ABSTRACT

A chocolate of good nutritional value offering improved tolerance to consumers who may be allergic to protein in cocoa or milk and/or sensitive to theobromine or caffeine and/or react to bioactive amines present in regular chocolate. It contains no cocoa liquor or cocoa powder or milk powder. Its protein source is protein hydrolysate and/or l-amino acids, the latter being selected to give good flavor while retaining the essential qualities of the protein.

38 Claims, No Drawings

CONSUMER FRIENDLY CHOCOLATE

The invention concerns consumer-friendly chocolate.

In recent years an increase in allergic reactions in all areas of the population has been reported. Many individuals suffer from symptoms after consumption of one of various foods. Among such foods chocolate has been observed to provoke allergic reactions. Symptoms may include mild to severe allergic skin eruptions and respiratory tract allergy. These effects have been attributed to cocoa proteins. Various patentees including Bresnick, U.S. Pat. No. 2,039,884 and Girsh, U.S. Pat. No. 4,078,093 have proposed methods of treating cocoa beans, cocoa liquor or cocoa powder in order to destroy the effect of these proteins. It is clear that consumer-friendly chocolate needs to have no active cocoa proteins present. However at best such treatments eliminate allergic response associated with cocoa protein but leave other substances in cocoa beans, cocoa liquor and cocoa powder which may provoke undesirable effects.

Theobromine and caffeine, reffered to chemically as methylxanthines, are stimulants found in cocoa beans, cocoa liquor and cocoa powder. Such methylxanthines are avoided by an increasing number of consumers as shown for example by the increasing popularity of decaffeinated coffee. A consumer-friendly chocolate should avoid the presence of such methylxanthines. In addition cocoa, together with other foods including cheese, contains small quantities of bioactive amines. These have been suggested as agents, for example, in provoking certain types of migraine. Again such bioactive amines should be effectively absent from consumer-friendly chocolate.

Some of the most popular varieties of chocolate contain not only cocoa liquor or cocoa powder but also milk powder. Milk protein present in milk powder is a well known allergen while many individuals are also intolerant to lactose, the sugar present in milk. Milk powder is clearly an unsuitable ingredient for consumer-friendly chocolate.

To meet the objectives of consumer-friendly chocolate it is evident that the composition of regular chocolate must be considerable altered. While in principle it might be possible to remove or denature all the known compounds in cocoa liquor or cocoa powder which may provoke sensitive individuals, that is proteins, methylxanthines and bioactive amines, it would be a very complex process with the possibility of introducing other undesirable chemicals. Consumer-friendly chocolate overcomes these problems by excluding cocoa liquor and cocoa powder. The only cocoa solids present are from cocoa butter.

A chocolate product containing cocoa butter but no cocoa liquor or cocoa powder is already well known in the form of white chocolate. Unfortunately white chocolate contains milk powder and thus milk protein and lactose. To remove all the milk powder from white chocolate would reduce the composition to merely fats and sugars which would be undesirable nutritionally. Consumer-friendly chocolate treats this problem by removing milk powder but replacing it with high quality protein, milk fat and either maltose, maltodextrin or lactose. The high quality protein is provided preferable by milk protein hydrolysate supplemented with l-amino acids or simply by an l-amino acid mixture. These non-intact protein sources have been used successfully for many years in hypo-allergenic enteral formulas or elemental formulas, exemplified by Mahmond, U.S. Pat. No. 4,670,268.

The use of protein hydrolysates and amino acid mixtures is not without difficulties, particularly their undesirable acidic and savoury flavours and bitter after-taste. Improvements to the flavour of protein hydrolysates have however been made recently and the debittered types are to be preferred. The flavour of amino acids is in principle not capable of being improved.

Detailed flavour assessment of individual amino acids and mixtures however led to a surprising result. This was that most of the objectionable flavour was due to the non-essential amino acids. Because they were not essential it was possible to eliminate the most offensive ones. These were glutamic acid, aspartic acid, arginine and cystine. Cystine is sometimes listed with essential amino acids but this is not because it is truly essential, rather it is because it has a sparing effect on the requirement for methionine. Removal of glutamic acid, aspartic acid, arginine and cystine gave a substantial improvement in flavour quality of consumer-friendly chocolate containing the amino acid mixture.

To improve the nutritional value of consumer-friendly chocolate a mineral mixture is added to increase the content of calcium, phosphate, magnesium, zinc, iron and iodine. The precise minerals used are of little importance provided they have good bioavailability and are permitted by the appropriate legislation. Typical suitable minerals are calcium carbonate, calcium phosphate, magnesium phosphate, zinc sulphate, electrolytic iron and potassium iodate. The quantity added as per invention is either one third of the daily requirement of the nutrients per 100 g chocolate or the proportion of the daily requirement equal to the proportion of the daily energy provided by the chocolate.

Vitamins are also added to improve the nutritional value. The range of vitamins includes vitamin C, vitamin B1, vitamin B2, vitamin B6, vitamin B12, vitamin A, beta carotene, vitamin E, vitamin D, niacin, folic acid, pantothenic acid and biotin. The quantities added are again related to the recommended daily requirement as for the mineral additions.

In order to improve sensory attributes of consumer-friendly chocolate it normally contains a natural, nature identical or synthetic non-allergenic flavour and where appropriate a non-allergenic colour. Texture improvement is accomplished by inclusion of lecithin.

Manufacture of consumer-friendly chocolate is similar to that used for regular white chocolate as far as regular ingredients are concerned. Special consideration is however necessary for protein hydrolysate, amino acids, vitamin mixture, mineral supplement, colour and flavouring. Protein hydrolysate and amino acids are more prone to reaction with reducing sugars, the Maillard reaction, than is intact protein. Vitamins, colour and flavourings vary in their stability to processing treatments while minerals can promote undesirable chemical reactions. To reduce unwanted changes all the special ingredients are added after conching of the other ingredients using the minimum temperature of mixing. The chocolate mix is then immediately tempered and moulded.

DETAILED DESCRIPTION OF PREFERRED EMBODIMENTS

The preferred composition in both quantity and type of ingredients for consumer-friendly chocolate is as follows:

1. Absence of cocoa liquor and cocoa powder.
2. From 8 to 12 percent by weight of either:
   (a) protein hydrolysate, preferably debittered casein or lactab bumin hydrolysate or particle size not greater than 100μ with or without and 1-amino acid supplement excluding glutamic acid, aspartic acid, arginine and cystine. The essential 1-amino acid profile to approximate closely that of whole milk protein.
   or
   (b) an 1-amino acid mixture excluding glutamic acid, aspartic acid, arginine and cystine. The essential 1-amino acid profile to approximate closely that of whole milk protein.

Preferably both (a) and (b) should supply at least the equivalent of 8 percent by weight of protein per 100 grams of chocolate.
3. From 25 to 30 percent by weight of cocoa butter, preferably 26 to 27 percent by weight of deodorised cocoa butter.
4. From 40 to 50 percent by weight of sugar, preferably from 43 to 44 percent by weight of cane sugar.
5. From 10 to 14 percent by weight of either maltose, lactose of maltodextrin, preferably 13 to 14 percent of either maltose or lactose.
6. From 6.5 to 9.5 percent by weight of milk fat preferably 7.5 to 8.0 percent by weight.
7. From 0.3 to 0.8 percent by weight of lecithin preferably about 0.5 percent of soya of milk lecithin.
8. Addition of selected vitamins and minerals in quantities such as to provide a fixed percentage of the daily requirements of the population. The preferred range of vitamins and minerals includes vitamin A, beta carotene, vitam C, vitamin B1, vitamin B2, vitamin B6, vitamin B12, vitamin D, vitamin E, niacin, folic acid, pantothenic acid, biotin, calcium, phsphorus magnesium, zinc, iron and iodine. Preferably the amounts of vitamins and minerals should provide either one third of the daily requirement in 100 g chocolate or the proportion of energy provided by 100 g chocolate to the total daily energy requirement.
9. Addition of non-allergenic flavouring and where appropriate colour in quantities dictated by good manufacturing practice.

The production of consumer-friendly chocolate requires modification to the usual manufacturing process for white chocolate. In particular protein hydrolysate, amino acids, vitamins, minerals, colour and flavour should not be added until all other ingredients have completed the chonching stage. Mixing to give a homogeneous mass should then be completed at as low a temperature and as quickly as practicable, followed immediately by tempering of the mass and moulding of chocolate.

The prime use of consumer-friendly chocolate is in the form of chocolate bars. It may however be used in other instances where regular chocolate is currently used. In such circumstances addition of vitamins, minerals, flavour and colour may not be appropriate. It may also find use in hypo-allergenic foods and anti-allergenic medications.

The manipulation of 1-amino acid content to approximate the profile of whole milk when using protein hydrolysate with 1-amino acid supplement and also when using an 1-amino acid mixture alone is demonstrated in Table I. The latter example also shows the avoidance of glutamic acid, aspartic acid, arginine and cystine in 1-amino acid mixtures.

The invention will now be described in more detail with reference to the formulations and manufacturing process outlined in Table II providing non limiting examples.

In Stage I part of the cocoa butter is mixed with sugar and either lactose or maltose for 10 mins in a suitable mixer e.g. Cut-O-Mat. The mass needs a particular texture, neither too sticky nor too dry, before refining and this is adjusted by increasing or decreasing the amount of cocoa butter added.

TABLE 1

Composition of hypoallergenic protein sources compared with whole milk protein.

| Amino Acids | Whole milk protein | Wt in grams of amino acids Hydrolysate + Amino acid supplement | | | Amino acid mixture |
|---|---|---|---|---|---|
| Essential | | | | | |
| l-isoleucine | 0.402 | 0.397 | + | 0.005 | 0.434 |
| leucine | 0.734 | 0.698 | + | 0.036 | 0.761 |
| lysine | 0.586 | 0.594 | | | 0.622 |
| methionine | 0.206 | 0.143 | + | 0.063 | 0.278 |
| phenylalanine | 0.390 | 0.223 | + | 0.167 | 0.392 |
| tyrosine | 0.322 | 0.202 | + | 0.120 | 0.328 |
| threonine | 0.356 | 0.430 | | | 0.354 |
| tryptophan | 0.103 | 0.092 | + | 0.011 | 0.113 |
| valine | 0.528 | 0.397 | + | 0.131 | 0.530 |
| Non-essential | | | | | |
| l-alanine | 0.275 | 0.475 | | | 0.304 |
| arginine | 0.287 | 0.438 | | | |
| aspartic acid | 0.608 | 0.817 | | | |
| cystine | 0.069 | 0.187 | | | |
| glutamic acid | 1.653 | 1.226 | | | |
| glycine | 0.161 | 0.545 | | | 1.474 |
| histidine | 0.218 | 0.119 | + | 0.099 | 0.210 |
| proline | 0.677 | 0.589 | | | 0.637 |
| serine | 0.425 | 0.428 | | | 1.563 |
| | 8.00 | 8.00 | + | 0.632 | 8.00 |

TABLE II

Formulations and Outline Process for Consumer Friendly Chocolate

| Process Stage | Ingredients | Wt in grams per 3 kg batch | |
|---|---|---|---|
| | | Example I | Example II |
| Stage I Mixing | Cocoa butter | 577.7 | 563.3 |
| | Sugar | 1404.0 | 1373.8 |
| | Lactose | 427.0 | |
| | Maltose | | 417.8 |
| Stage II Refining of Stage I mass | | | |
| Stage III Conching | Stage II mass | | |
| | Cocoa butter | 288.9 | 282.7 |
| | Milk fat | 254.1 | 248.6 |
| | Lecithin | 16.8 | 16.4 |
| Stage IV Mixing | Stage III mass | | |
| | Amino acid mix | 28.2 | |
| | Protein hydrolysate | | 31.2 |
| | Amino acid supplement | | 2.2 |
| | Flavouring | 1.5 | 1.5 |
| | Colour | 1.8 | |
| | Vitamin mix | | 1.5 |
| | Mineral mix | | 59.0 |
| Stage V Tempering and Moulding | | | |
| | | 3000.0 | 3000.0 |

In Stage II the Stage I mass is presented to a three roll refiner operating at preferred pressures of 11 bar on the rolls and 5 bar on the knife. A particle size reduction of the sugars to not more than 20 μm is attained.

In Stage III the Stage II mass is added to a heated conch and mixed at 50° C. for 20-30 mins at 50 rpm. This ensures that free moisture is removed before other ingredients are added. Milk fat, lecithin and the remainder of the cocoa butter are added and the mass is conched at 56° C. for 17 hrs at 70 rpm.

In Stage IV the remaining ingredients, including protein sources, flavouring, colour and vitamin and mineral mixes are added. Before addition the particle size of protein hydrolysate, 1-amino acid mix, and vitamin and mineral mixes may need to be reduced. A particle size of not more than 100 μm is preferred but the powder must in any case readily pass through a 1 mm mesh sieve. Size reduction is performed by grinding in an agate mill for 3-4 hrs.

Two procedures have been found useful for addition of the Stage IV ingredients.

1. The ground hydrolysate and/or amino acid mixture is slowly passed through a screen (1 mm mesh) during 4 hrs into the Stage III mass. The remaining Stage IV ingredients are then added. During additions the mass is continuously stirred and a temperature of 40° C. is maintained.

2. Alternatively the Stage IV ingredients are added to a 600 g portion of the Stage III mass. Addition as in (1) is effected by passing through a screen (1 mm mesh). The mass is stirred manually to give homogenicity and the mass is then presented to a three roll refiner operating at preferred pressures of 9 bar on the rolls and 5 bar on the knife. The refined mass is held for 30 mins at 50° C., manually mixed and added to the remainder of the Stage III mass. The whole is stirred mechanically for 20 mins at 40° C.

Procedure (2) offers some advantages over procedure (1) when additions of vitamins and/or minerals and/or colour are to be made.

In Stage V the Stage IV mass from either procedure (1) or procedure (2) is passed through a sieve, then held at 50°-60° C. for 30 mins and finally tempered and moulded according to well known processes.

It is possible to enrich consumer-friendly chocolate with ingredients e.g. vitamins, minerals, colours and flavourings after Stage V. The end product of the invention is remelted and the desired substances are stirred either into the total mass or at first only into a part of the chocolate. Subsequently the chocolate is again tempered and moulded.

During the execution of the Stages outlined above the parameters of time and temperature are to be closely monitored. Especially when applying relatively high temperatures over long periods of time undesirable reactions may occur. These include Maillard reactions, loss of flavour, change in colour and loss of available amino acids and vitamins. It is necessary to check for such losses during processing and where possible to restore the product quality before tempering and moulding of the chocolate.

While specific examples have been given to illustrate the invention, it is to be understood that those skilled in the art will recognise variations without departing from the spirit and scope of the invention.

I claim:

1. A hypo-allergenic chocolate of nutritional value at least equal to white chocolate which consists essentially of: cocoa-butter, sucrose, lecithin, milk fat, and either
   (a) protein hydrolysate and an amino acid supplement free from glutamic acid, aspartic acid, arginine and cysteine, or
   (b) an amino acid mixture free from glutamic acid, aspartic acid, arginine and cysteine.

2. A hypo-allergenic chocolate of nutritional value at least equal to white chocolate which consists essentially of: cocoa-butter, sucrose, lecithin, milk fat, maltose and/or lactose and/or maltodextrin, and either
   (a) protein hydrolysate and an amino acid supplement free from glutamic acid, aspartic acid, arginine, and cysteine, or
   (b) an amino acid mixture free from glutamic acid, aspartic acid, arginine and cysteine.

3. A chocolate according to claim 1, wherein the protein hydrolysate and/or amino acid supplement content ranges from about 8% to about 12% by weight.

4. A chocolate according to claim 1, wherein the protein hydrolysates are enzymatically produced from either casein, lactalbumin, rice protein, soy protein or meat protein.

5. A chocolate according to claim 4, wherein the protein hydrolysates are enzymatically produced from casein or lactalbumin.

6. A chocolate according to claim 1, wherein the chocolate is enriched with vitamin A, vitamin C, vitamin B1, vitamin B2, vitamin B6, vitamin B12, vitamin D, vitamin E, beta carotene, niacin, folic acid, pantothenic acid and biotin or any combination thereof.

7. A chocolate according to claim 6, wherein the chocolate is enriched with the mineral nutrients calcium, magnesium, zinc, iron, phosphate and iodine or any combination thereof.

8. A chocolate according to claim 7, wherein the chocolate contains non-allergenic flavoring.

9. A chocolate according to claim 8, wherein the chocolate contains non-allergenic natural or nature identical coloring agents.

10. A process for the manufacture of chocolate according to claim 9, wherein the process for the manufacture of white chocolate of mixing, refining, conching, tempering, and molding is modified to allow the addition and mixing of protein hydrolysate and/or an amino acid supplement in combination with vitamins, minerals, flavoring and coloring after all other ingredients have completed the conching stage.

11. A chocolate according to claim 2, wherein the protein hydrolysate and/or amino acid supplement content ranges from about 8% to about 12% by weight.

12. A chocolate according to claim 2, wherein the protein hydrolysates are enzymatically produced from either casein, lactalbumin, rice protein, soy protein or meat protein.

13. A chocolate according to claim 12, wherein the protein hydrolysates are enzymatically produced from either casein or lactalbumin.

14. A chocolate according to claim 2, wherein the chocolate is enriched with vitamin A, vitamin C, vitamin B1, vitamin B2, vitamin B6, vitamin B12, vitamin D, vitamin E, beta carotene, niacin, folic acid, pantothenic acid and biotin or any combination thereof.

15. A chocolate according to claim 3, wherein the chocolate is enriched with vitamin A, vitamin C, vitamin B1, vitamin B2, vitamin B6, vitamin B12, vitamin D, vitamin E, beta carotene, niacin, folic acid, pantothenic acid and biotin or any combination thereof.

16. A chocolate according to claim 4, wherein the chocolate is enriched with vitamin A, vitamin C, vitamin B1, vitamin B2, vitamin B6, vitamin B12, vitamin D, vitamin E, beta carotene, niacin, folic acid, pantothenic acid and biotin or any combination thereof.

17. A chocolate according to claim 1, wherein the chocolate is enriched with the mineral nutrients calcium, magnesium, zinc, iron, phosphate and iodine or any combination thereof.

18. A chocolate according to claim 2, wherein the chocolate is enriched with the mineral nutrients calcium, magnesium, zinc, iron, phosphate and iodine or any combination thereof.

19. A chocolate according to claim 3, wherein the chocolate is enriched with the mineral nutrients calcium, magnesium, zinc, iron, phosphate and iodine or any combination thereof.

20. A chocolate according to claim 4, wherein the chocolate is enriched with the mineral nutrients calcium, magnesium, zinc, iron, phosphate and iodine or any combination thereof.

21. A chocolate according to claim 1, wherein the chocolate contains non-allergenic flavoring.

22. A chocolate according to claim 2, wherein the chocolate contains non-allergenic flavoring.

23. A chocolate according to claim 3, wherein the chocolate contains non-allergenic flavoring.

24. A chocolate according to claim 4, wherein the chocolate contains non-allergenic flavoring.

25. A chocolate according to claim 6, wherein the chocolate contains non-allergenic flavoring.

26. A chocolate according to claim 1, wherein the chocolate contains non-allergenic natural or nature identical coloring agents.

27. A chocolate according to claim 2, wherein the chocolate contains non-allergenic natural or nature identical coloring agents.

28. A chocolate according to claim 3, wherein the chocolate contains non-allergenic natural or nature identical coloring agents.

29. A chocolate according to claim 4, wherein the chocolate contains non-allergenic natural or nature identical coloring agents.

30. A chocolate according to claim 6, wherein the chocolate contains non-allergenic natural or nature identical coloring agents.

31. A chocolate according to claim 7, wherein the chocolate contains non-allergenic natural or nature identical coloring agents.

32. A process for the manufacture of chocolate according to claim 1, wherein the process for the manufacture of white chocolate of mixing, refining, conching, tempering, and molding is modified to allow the addition of protein hydrolysate and/or an amino acid supplement in combination with vitamins, minerals, flavoring and coloring after all other ingredients have completed the conching stage.

33. A process for the manufacture of chocolate according to claim 2, wherein the process for the manufacture of white chocolate of mixing, refining, conching, tempering, and molding is modified to allow the addition of protein hydrolysate and/or an amino acid supplement in combination with vitamins, minerals, flavoring and coloring after all other ingredients have completed the conching stage.

34. A process for the manufacture of chocolate according to claim 3, wherein the process for the manufacture of white chocolate of mixing, refining, conching, tempering, and molding is modified to allow the addition of protein hydrolysate and/or an amino acid supplement in combination with vitamins, minerals, flavoring and coloring after all other ingredients have completed the conching stage.

35. A process for the manufacture of chocolate according to claim 4, wherein the process for the manufacture of white chocolate of mixing, refining, conching, tempering, and molding is modified to allow the addition of protein hydrolysate and/or an amino acid supplement in combination with vitamins, minerals, flavoring and coloring after all other ingredients have completed the conching stage.

36. A process for the manufacture of chocolate according to claim 6, wherein the process for the manufacture of white chocolate of mixing, refining, conching, tempering, and molding is modified to allow the addition of protein hydrolysate and/or an amino acid supplement in combination with vitamins, minerals, flavoring and coloring after all other ingredients have completed the conching stage.

37. A process for the manufacture of chocolate according to claim 7, wherein the process for the manufacture of white chocolate of mixing, refining, conching, tempering, and molding is modified to allow the addition of protein hydrolysate and/or an amino acid supplement in combination with vitamins, minerals, flavoring and coloring after all other ingredients have completed the conching stage.

38. A process for the manufacture of chocolate according to claim 8, wherein the process for the manufacture of white chocolate of mixing, refining, conching, tempering, and molding is modified to allow the addition of protein hydrolysate and/or an amino acid supplement in combination with vitamins, minerals, flavoring and coloring after all other ingredients have completed the conching stage.

* * * * *